May 20, 1952 H. B. HAASE 2,597,318

FLY ROD SPINNING REEL

Filed May 20, 1950

INVENTOR

HUGO B. HAASE

BY Gustave Miller

ATTORNEY

Patented May 20, 1952

2,597,318

UNITED STATES PATENT OFFICE 2,597,318

FLY ROD SPINNING REEL

Hugo B. Haase, Sheridan, Wyo.

Application May 20, 1950, Serial No. 163,138

4 Claims. (Cl. 242—84.5)

1

This invention relates to a fly rod spinning reel and has for an object to provide an improved fly rod spinning reel having a non-rotating spool and a minimum of movable parts.

A further object of this invention is to provide a fly rod spinning reel wherein the line may be wound either in a clockwise or counterclockwise direction and which is suitable for either right or left hand operation.

A further object of this invention is to provide a fly rod spinning reel wherein the line may be cast and may unwind from the spool without causing or necessitating the rotation of any parts while the line is unwinding from the spool.

A further object of this invention is to provide a fly rod spinning reel wherein the reel may be changed from casting to retrieving position and vice versa by the movement of a single plunger and wherein the position of the plunger informs the fisherman at a glance whether the reel is in casting or retrieving position, yet wherein there is very little likelihood of accidentally operating the plunger.

A further object of this invention is to provide a fly rod spinning reel wherein the line is wound and unwound from the stationary spool without leaving a twist in the unwound line.

A further object of this invention is to provide a fly rod spinning reel which is simple to manufacture and assemble and which may be easily disassembled and reassembled by the fisherman by removing a single screw thereby enabling the entire structure to be serviced and cleaned with ease.

A further object of this invention is to provide a fly rod spinning reel which may be attached to and used on an ordinary fly rod.

A further object of this invention is to provide a fly rod spinning reel wherein the winding mechanism and the reel are both enclosed within a housing and which is not cumbersome or awkward to handle.

With the foregoing and other objects in view, as will hereinafter become apparent, this invention provides a construction, combination and arrangement of parts hereinafter set forth, claimed and disclosed in the accompanying drawing, wherein:

2

Figure 1:
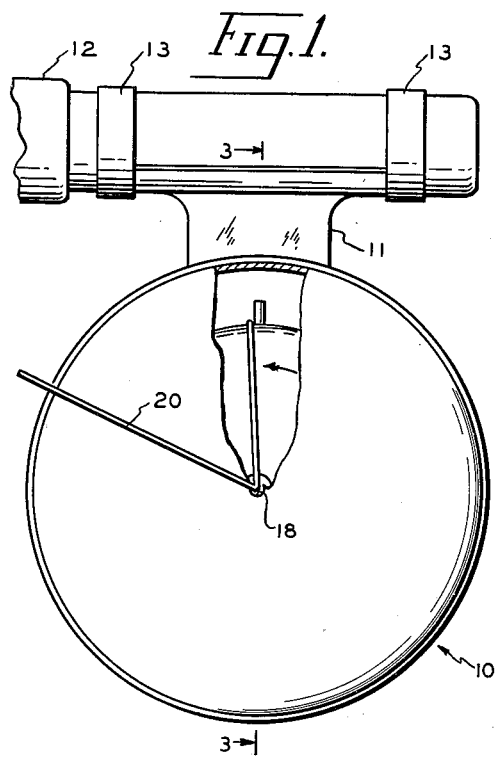
Fig. 1 is a plan view of the fly rod spinning reel partly broken away and looking at the line side.
Figure 2:
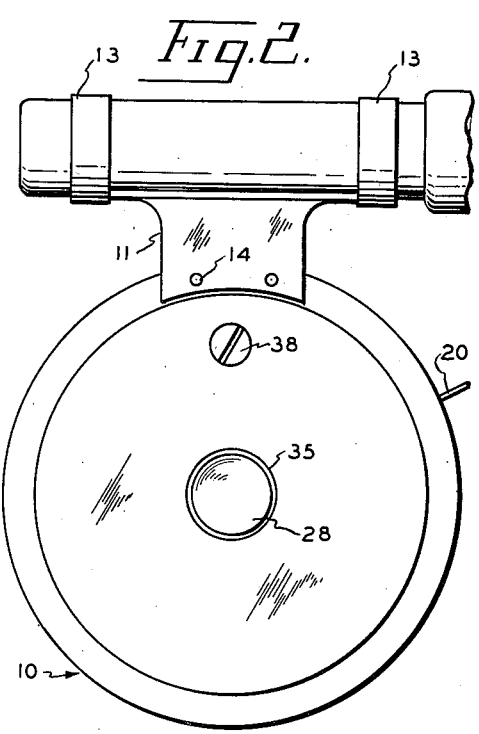
Fig. 2 is a similar plan view looking at the crank operating side.

There is shown at 10 the fly rod spinning reel of this invention having a curved attachment portion 11 for attaching the reel 10 to a fly rod 12 by the customary rings 13. This curved attachment portion 11 is suitably secured as by rivets 14 to the reel body 15, the reel body 15 being provided with a flange 16 for receiving a cover 17 therein, the cover 17 having a central aperture 18 through which the line 20 may pass. The reel body 15 provides a flange for the stationary spool 21 having a smaller flange 22 so that the line 20 may wind up on the spool 21. The cover 17 is held to the flange 16 in any suitable manner such as by friction or by a conveniently provided bayonet joint means 19 if desired. Extending through the center of the reel body 15 and stationary spool 21 is a bushing 23 within which is rotatably mounted the hub 24 to which is secured the winding drum flange 25.

A tension washer 26 is located about the end of the bushing 23 between the stationary spool 21 and the enlarged head 27 of the hub 24 thus providing the necessary friction to prevent undesired rotation of the winding drum flange 25.

Reciprocably extending through the hollow hub 24 is a plunger 28 having a beveled or cam end 30 and a finger receiving depression 29 for cooperation with the inner end of a line pick-up finger 31. Mounted on the line pick-up finger 31 is a collar 32 and biased between the collar 32 and the inside of the winding drum flange 25 is a coil expansion spring 33. The drum flange 25 is apertured so as to permit the outer end of the pick-up finger 31 to extend or retract therethrough and the collar 32 is spaced from the head 27 of hub 24 a distance at least equal to the distance that the outer end of the pick-up finger 31 extends through the aperture in the winding drum flange 25 when the pick-up finger 31 is in the line pick-up position shown in Fig. 3 with the plunger 28 extended therein.

Mounted on the end of the hub 24 and spaced from the side of the reel body 15 by means of a flange 34 on the bushing 23 is a crank hub 35. Fixed on the crank hub 35 is the brake drum 36 to which is secured the crank roller 37 on the stud screw 38 extending into the brake drum 36. Extending through the crank hub 35 is a set screw 40 which also extends through the hollow hub 24 and into a longitudinal slot 41 in the plunger 28, the slot 41 cooperating with the end of set screw 40 to limit the reciprocatory motion of the plunger 28. Removal of the screw 40 permits the plunger 28 to be entirely withdrawn, thus permitting the entire assembly to be dismantled for cleaning as desired, a screw driver access opening 42 being provided in the brake flange 43 of the brake drum 36.

In operation, one end of the line 20 is secured to the stationary reel 21 and extends over the winding drum flange 25 and through the cover aperture 18. In the position shown in Fig. 3, the plunger 28 has been pushed in to the line retrieving position. In this position the crank roller 37 is manipulated to rotate the attached parts thus rotating the hub 24 and its enlarged head 27 with the pick-up finger 31 extending through the winding drum 25. With the pick-up finger 41 thus extending through the winding drum 25, rotation of the winding drum 25 thus causes the finger 31 to feed the line 20 about the reel 21.

Figure 3:
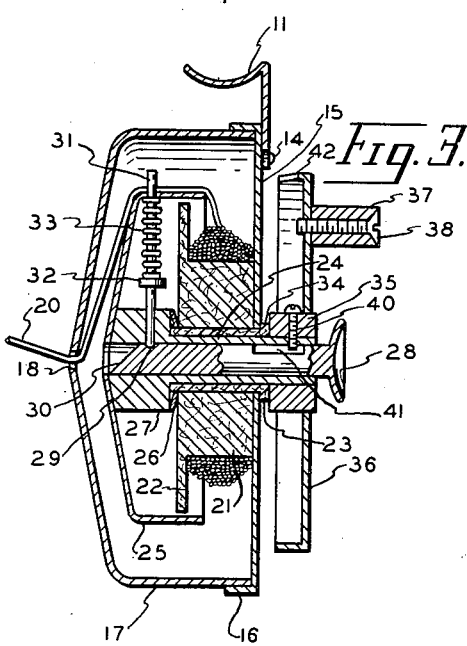
Fig. 3 is a sectional view on line 3—3 of Fig. 1.
Figure 4:
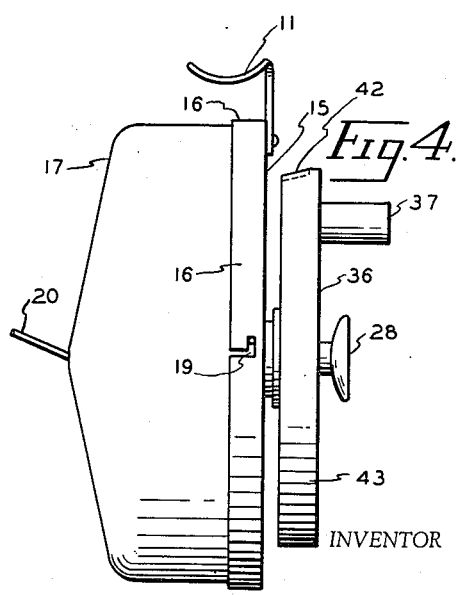
Fig. 4 is an end elevational view.

In order to change the reel from retrieving operation to ready it for casting operating, the plunger 28 will be withdrawn, that is, moved to the right as viewed in Fig. 3. This will retract the plunger 28 from beneath the end of pick-up finger 31 permitting the spring 33 to expand, moving the inside end of the finger 31 into the space provided by the retraction of the beveled end 30 of the plunger 28. At the same time, the outside end of the finger 31 will be retracted to a position at least flush with the outside of the winding drum flange 25. As held in this position, the line 20 may be cast by the rod 12 in the usual manner and the line 20 will unreel from the spool 21 and pass through the aperture 18 of cover 17 while drum flange 25 remains stationary. In order to retrieve the line, the plunger 28 will be pressed inwardly again, the inner end of pick-up finger 31 riding up on the beveled end 30 of plunger 28 and then dropping into the slight depression 29, thus holding the plunger 28 in this position until it is deliberately retracted for casting operation.

The line 20 will wind and unwind on the reel 21 without leaving a twist in the unwound line due to the fact that the reel 21 is stationary and the winding is caused by the pick-up finger 31 while the unwinding takes place without any movements of any rotating part.

While the preferred form of this invention has been shown and described, it will be understood that this invention is not restricted to the particular details of construction and arrangement hereinbefore set forth but that changes in such detail of construction may be made within the scope of what is hereinafter claimed.

Having thus set forth and disclosed the nature of this invention, what is claimed is:

1. A fly rod spinning reel comprising a reel body including a stationary line receiving spool affixed thereto, said reel body having means for attaching it to a fly rod, a hollow hub extending through said reel body, a bearing interposed between said hollow hub and said reel body and stationary spool, an enlarged hub head at one end of said hollow hub, a winding drum flange fixed on one end of said hub, a line pick-up finger reciprocably extendable at one end through said winding drum flange and its other end through said enlarged hub head, a collar secured on said pick-up finger and spaced from said enlarged hub head a distance at least equal to the distance that the end of the pick-up finger may be extended through said winding drum flange, an expansion spring about said pick-up finger biased between said collar and the inside of said winding drum flange, a reciprocal plunger extending through said hollow hub and having a beveled end cooperating with the inside end of said pick-up finger for extending said reciprocating finger against said biasing spring through said winding drum flange, said plunger having a finger end receiving depression adjacent its beveled end, a crank and brake drum, a crank hub on which said crank and brake drum is fixed, securing means extendable through said crank drum hub and said hollow hub, said reciprocable clutch plunger having a longitudinal slot into which the end of said securing means extends, the end walls of said longitudinal slot cooperating with said securing means to limit its reciprocation, whereby said plunger when extended beneath the end of said line pick-up finger causes said pick-up finger to wind a line around said stationary reel as said crank drum is rotated and permits said pick-up finger to be disengaged from the line when the plunger is retracted therefrom for casting.

2. A fly rod spinning reel comprising a reel body including a stationary line receiving spool affixed thereto, said reel body having means for attaching it to a fly rod, a hollow hub extending through said reel body, a bearing bushing interposed between said hollow hub and said reel body and stationary spool, an enlarged hub head at one end of said hollow hub, a friction means between said hub head and said stationary spool, a winding drum fixed on said enlarged hub head, said winding drum having a radially extending flange, a line pick-up finger reciprocably extendable at one end through said winding drum flange and its other end through said enlarged hub head, a collar secured on said pick-up finger and spaced from said enlarged hub head a distance at least equal to the distance that the end of the pick-up finger may be extended through said winding drum flange, an expansion spring about said pick-up finger biased between said collar and the inside of said winding drum flange, a reciprocal plunger extending through said hollow hub and having a beveled end cooperating with the inside end of said pick-up finger for extending said reciprocating finger against said biasing spring through said winding drum flange, said plunger having a finger end receiving depression adjacent its beveled end, a crank and brake drum, a crank hub on which said crank and brake drum is fixed, securing means extendable through said crank drum hub and said hollow hub, said reciprocable plunger having a longitudinal slot into which the end of said securing means extends, the end walls of said longitudinal slot cooperating with said securing means to limit its reciprocation, whereby said plunger when extended beneath the end of said line pick-up finger causes said pick-up finger to wind a line around said stationary reel as said crank drum is rotated and permits said pick-up finger to be disengaged from the line when the plunger is retracted therefrom for casting.

3. A fly rod spinning reel comprising a reel body including a stationary line receiving spool affixed thereto, said reel body having means for attaching it to a fly rod, a centrally apertured cover mounted on said real body, a hollow hub extending through said reel body, a bearing bushing interposed between said hollow hub and said reel body and stationary spool, an enlarged hub head at one end of said hollow hub, a friction means between said hub head and said stationary spool, a winding drum fixed on said enlarged hub head, said winding drum having a radially extending flange, a line pick-up finger reciprocably extendable at one end through said winding drum flange and its other end through said enlarged hub head, a collar secured on said pick-up finger and spaced from said enlarged hub head a distance at least equal to the distance that the end of the pick-up finger may be extended through said winding drum flange, an expansion spring about said pick-up finger biased between said collar and the inside of said winding drum flange, a reciprocal plunger extending through said hollow hub and having a beveled end cooperating with the inside end of said pick-up finger for extending said reciprocating finger against said biasing spring through said winding drum flange, said plunger having a finger end receiving depression adjacent its beveled end, a crank and brake drum, a crank hub on which said crank and brake drum is fixed, set screw means extendable through said crank drum hub and said hollow hub, said reciprocable plunger having a longitudinal slot into which the end of said set screw extends, the end walls of said longitudinal slot cooperating with said set screw means to limit its reciprocation, whereby said plunger when extended beneath the end of said line pick-up finger causes said pick-up finger to wind a line around said stationary reel as said crank drum is rotated and permits said pick-up finger to be disengaged from the line when the plunger is retracted therefrom for casting, the line passing through said centrally apertured cover.

4. A fly rod spinning reel comprising a reel body including a stationary line receiving spool affixed thereto, said reel body having means for attaching it to a fly rod, a hollow hub extending through said reel body, a bearing interposed between said hollow hub and said reel body and stationary spool, an enlarged hub head at one end of said hollow hub, a winding drum flange fixed on one end of said hub, a line pick-up finger reciprocably extendable at on end through said winding drum flange and its other end through said enlarged hub head, a collar secured on said pick-up finger and spaced from said enlarged hub head a distance at least equal to the distance that the end of the pick-up finger may be extended through said winding drum flange, an expansion spring about said pick-up finger biased between said collar and the inside of said winding drum flange, a reciprocal plunger extending through said hollow hub and having a beveled end cooperating with the inside end of said pick-up finger for extending said reciprocating finger against said biasing spring through said winding drum flange, a crank and brake drum, a crank hub on which said crank and brake drum is fixed, securing means extendable through said crank drum hub and said hollow hub, said reciprocable clutch plunger having a longitudinal slot into which the end of said securing means extends, the end walls of said longitudinal slot cooperating with said securing means to limit its reciprocation, whereby said plunger when extended beneath the end of said line pick-up finger causes said pick-up finger to wind a line around said stationary reel as said crank drum is rotated and permits said pick-up finger to be disengaged from the line when the plunger is retracted therefrom for casting.

HUGO B. HAASE.

REFERENCES CITED

The following references are of record in the file of this patent:

UNITED STATES PATENTS

| Number | Name | Date |
|---|---|---|
| 2,492,587 | Ledingham | Dec. 27, 1949 |